(12) United States Patent
Knowlton et al.

(10) Patent No.: US 9,041,992 B2
(45) Date of Patent: May 26, 2015

(54) FIBER STABILIZATION OF OPTICAL PATH DIFFERENCES (OPD) OVER A WIDE BANDWIDTH FREQUENCY RANGE FOR EXTENDED PERIODS OF TIME

(71) Applicant: THE BOEING COMPANY, Chicago, IL (US)

(72) Inventors: Paul V. Knowlton, Albuquerque, NM (US); Angel A. Portillo, Albuquerque, NM (US); Michael C. Cates, Albuquerque, NM (US)

(73) Assignee: THE BOEING COMPANY, Chicago, IL (US)

(*) Notice: Subject to any disclaimer, the term of this patent is extended or adjusted under 35 U.S.C. 154(b) by 316 days.

(21) Appl. No.: 13/745,608

(22) Filed: Jan. 18, 2013

(65) Prior Publication Data

US 2014/0204439 A1 Jul. 24, 2014

(51) Int. Cl.
*G02B 26/08* (2006.01)
*G01B 9/02* (2006.01)

(52) U.S. Cl.
CPC ........ *G02B 26/0816* (2013.01); *G01B 9/02067* (2013.01); *G01B 2290/10* (2013.01); *Y10S 359/90* (2013.01)

(58) Field of Classification Search
CPC ........... G01B 2290/70; G01B 9/02059; G01B 2290/10; G01B 9/02; G01B 9/06; H01S 3/13; G01S 17/89; G01S 7/481; G02B 26/06; G02B 27/00; G02B 26/08; G02B 26/0816; G02B 6/293; G02B 23/00

USPC ..................... 359/212.1, 223.1; 356/484, 486
See application file for complete search history.

(56) References Cited

U.S. PATENT DOCUMENTS

2005/0231727 A1* 10/2005 Podoleanu et al. ........... 356/479
2008/0304077 A1* 12/2008 Demarest ...................... 356/486

OTHER PUBLICATIONS

Exended European Search Report, Patent Application No. EP 14150572.7-1562, Apr. 16, 2014.
(Continued)

*Primary Examiner* — James Phan
(74) *Attorney, Agent, or Firm* — Vista IP Law Group LLP; Cynthia A. Dixon

(57) ABSTRACT

The disclosed method for fiber stabilization of optical path differences involves splitting a laser produced optical beam into a first and second optical beam. Further, the method involves circulating the first optical beam to an adjustable optical telescope, and circulating the second optical beam to a reference optical telescope. Also, the method involves splitting the first circulated beam into the first optical beam and the adjustable optical telescope beam, and splitting the second circulated beam into the second optical beam and the reference optical telescope beam. Additionally, the method involves inputting, into an interferometer, the first and second optical beams; and outputting, from the interferometer, a sinusoidal signal. Also, the method comprises filtering the sinusoidal signal to form a high frequency and low frequency signal. Further, the method involves controlling a translation stage by using the low frequency signal, and controlling a fiber stretcher by using the high frequency signal.

20 Claims, 4 Drawing Sheets

(56) References Cited

OTHER PUBLICATIONS

Olivier, et al., "Mafi Experiment: Development of Photonic Devices for a Space-based Multiaperature Fibre-Linked Interferometer", Applied Optics, Optical Society of America, Washington, DC; US, vol. 46, No. 6, Feb. 20, 2007, pp. 834-844, XP001504652, ISSN: 0003-6935, DOI: 10.1364/A0.46.000834; figures 3 and 5; p. 837, right-hand column, paragraph 5; p. 837, right-hand column, paragraph 3; figure 4; p. 838, left-hand column, paragraph 2; p. 837, right-hand column, paragraph 7; figure 9; p. 836, right-hand column, paragraph 1, p. 844, left-hand.

Olivier, et al., "First test on an integrated optics potential for optical path stabilization in a stellar interferometer", Journal of Optics, A, Pure and Applied Optics, Institute of Physics Publishing, Bristol, GB, vol. 7, No. 11, Nov. 1, 2005, pp. 660-662, XP020093021, ISSN: 1464-4258, DOI: 10.1088/1464-4258/7/111007, figure 1.

Cliche, et al., "Precision timing control for radioastromony maintaining femtosecond synchronization in the atacama large millimeter array", IEEE Control Systems Magazine, vol. 26, No. 1, Feb. 1, 2006, pp. 19-26, XP055111212, ISSN: 0272-1708, DOI: 10.1109/MCS. 2006.1580149; figures 2 and 4, p. 23, left-hand column, paragraph 1.

Minardi, et al., "An active fiber sensor for mirror vibration metrology in astronomical interferometers", Astronomische Nachrichten, vol. 330, No. 5, Jun. 1, 2009, pp. 518-522, XP055111288, ISSN: 0004-6337, DOI: 10.1002/asna.200911201; p. 520, left-hand column, paragraph 1, figure 16.

Reynaud, et al., "Stabilization and control of fiber array for the coherent transport of beams in a stellar interferometer", Integrated Optics for Astronomical Interferometry, Jan. 1, 1997, p. 249, XP055111391, retrieved from the internet: URL:http://articles.adsabs.harvard.edu/cgi-bin/nph-iarticle_query?1997ioai.book.. 249R&defaultprint=YES&filetype=.pdf, retrieved on Apr. 1, 2014; figure 2.

Vardhan, et al., "An Active Interferometer-Stabilization Scheme with Linear Phase Control", Optical Society of America, 2006.

Musha, et al., "Robust and Precise Length Stabilization of a 25-km Long Optical Fiber Using an Optical Interferometric Method with a Digital Phase-Frequency Discriminator", Applied Physics: Lasers and Optics, 2006.

Goullioud, et al., "Dim Star Fringe Stabilization Demonstration Using Path length Feed-Forward on the SIM Test-Bed 3", SPIE Inter. Sym. on Interferometry in Space, Aug. 2002.

F. Reynaud, et al., "Interferometric Control of Fiber Lengths for a Coherent Telescope Array", App. Opt vol. 31, No. 19, pp. 3736-3743, Jul. 1, 1992.

F. Reynaud, et al., "Interferometric Fiber Arms for Stellar Interferometry", SPIE vol. 2209.

* cited by examiner

FIBER STABILIZATION OF OPTICAL PATH DIFFERENCES (OPD) OVER A WIDE BANDWIDTH FREQUENCY RANGE FOR EXTENDED PERIODS OF TIME

BACKGROUND

The present disclosure relates to fiber stabilization of optical path differences (OPD). In particular, it relates to fiber stabilization of OPD over a wide bandwidth frequency range for extended periods of time.

SUMMARY

The present disclosure relates to a method, system, and apparatus for fiber stabilization of OPD over a wide bandwidth frequency range for extended periods of time. In one or more embodiments, the present disclosure teaches a method for fiber stabilization of OPD. The disclosed method involves radiating, by a laser, an optical beam. The method further involves splitting, by a beam splitter, the optical beam into a first optical beam and a second optical beam. Also, the method involves circulating, by a first circulator, the first optical beam through a fiber stretcher to a translation stage of an adjustable optical telescope. In addition, the method involves reflecting, by a first mirror on the translation stage, the first optical beam. Additionally, the method involves circulating, by the first circulator, a first circulated beam, which comprises the first optical beam and an adjustable optical telescope beam, to a first dichroic beam splitter. Also, the method involves splitting, by the first dichroic beam splitter, the first circulated beam into the first optical beam and the adjustable optical telescope beam. In addition, the method involves circulating, by a second circulator, the second optical beam to a reference optical telescope. Additionally, the method involves reflecting, by a second mirror, the second optical beam. In addition, the method involves circulating, by the second circulator, a second circulated beam, which comprises the second optical beam and a reference optical telescope beam, to a second dichroic beam splitter. Also, the method involves splitting, by the second dichroic beam splitter, the second circulated beam into the second optical beam and the reference optical telescope beam.

Additionally, the method involves inputting, into an interferometer, the first optical beam and the second optical beam. In addition, the method involves outputting, from the interferometer, an in-phase signal and a quadrature signal, which together form a sinusoidal signal. Additionally, the method involves filtering, by at least one processor, the sinusoidal signal to form a wide bandwidth signal, which contains a high frequency signal, and a low frequency signal. The method further involves controlling, with a stage controller, the translation stage by using the low frequency signal. Further, the method involves controlling, with a fiber stretcher controller, the fiber stretcher by using the high frequency signal.

In one or more embodiments, the method further involves inputting, into a telescope light receiving interferometer, the adjustable optical telescope beam and the reference optical telescope beam, to produce a binocular image. In at least one embodiment, the interferometer is a Michelson interferometer. In some embodiments, the method further involves amplifying with a first amplifier the in-phase signal, and amplifying with a second amplifier the quadrature signal.

In at least one embodiment, the method further involves prefiltering, with a filter buffer card, the in-phase signal and the quadrature signal to be within at least one predetermined frequency band. In some embodiments, the fiber stretcher controller is a fiber stretcher power supply. In one or more embodiments, the filtering of the sinusoidal signal to form a high frequency signal and a low frequency signal is performed by integrating the sinusoidal signal. In some embodiments, the stage controller is a piezo electric controller.

In one or more embodiments, a system for fiber stabilization of OPD involves a laser to radiate an optical beam. The system further involves a beam splitter to split the optical beam into a first optical beam and a second optical beam. Also, the system involves a first circulator to circulate the first optical beam through a fiber stretcher to a translation stage of an adjustable optical telescope, and to circulate a first circulated beam, which comprises the first optical beam and an adjustable optical telescope beam, to a first dichroic beam splitter. In addition, the system involves a first mirror, on the translation stage, to reflect the first optical beam. Also, the system involves the first dichroic beam splitter to split the first circulated beam into the first optical beam and the adjustable optical telescope beam. In addition, the system involves a second circulator to circulate the second optical beam to a reference optical telescope, and to circulate a second circulated beam, which comprises the second optical beam and a reference optical telescope beam, to a second dichroic beam splitter. Also, the system involves a second mirror to reflect the second optical beam. Additionally, the system involves the second dichroic beam splitter to split the second circulated beam into the second optical beam and the reference optical telescope beam.

In addition, the system involves an interferometer to receive the first optical beam and the second optical beam, and to output an in-phase signal and a quadrature signal, which together form a sinusoidal signal. Also, the system involves at least one processor to filter the sinusoidal signal to form a high frequency signal and a low frequency signal. Additionally, the system involves a stage controller to control the translation stage by using the low frequency signal. Further, the system involves a fiber stretcher controller to control the fiber stretcher by using the high frequency signal.

In at least one embodiment, the system further involves a telescope light receiving interferometer to receive the adjustable optical telescope beam and the reference optical telescope beam, and to produce a binocular image. In some embodiments, the system further involves a first amplifier to amplify the in-phase signal, and a second amplifier to amplify the quadrature signal. In at least one embodiment, the system further involves a filter buffer card to prefilter the in-phase signal and the quadrature signal to be within at least one predetermined frequency band. In some embodiments, at least one processor, to filter the sinusoidal signal to form a high frequency signal and a low frequency signal, integrates the sinusoidal signal.

In one or more embodiments, an apparatus for fiber stabilization of OPD involves a laser to radiate an optical beam. The apparatus further involves a beam splitter to split the optical beam into a first optical beam and a second optical beam. In addition, the apparatus involves a first circulator to circulate the first optical beam through a fiber stretcher to a translation stage of an adjustable optical telescope, and to circulate a first circulated beam, which comprises the first optical beam and an adjustable optical telescope beam, to a first dichroic beam splitter. Also, the apparatus involves a first mirror, on the translation stage, to reflect the first optical beam. Additionally, the apparatus involves the first dichroic beam splitter to split the first circulated beam into the first optical beam and the adjustable optical telescope beam. Also, the apparatus involves a second circulator to circulate the second optical beam to a reference optical telescope, and to circulate a second circulated beam, which comprises the second optical beam and a reference optical telescope beam, to a second dichroic beam splitter. In addition, the apparatus involves a second mirror to reflect the second optical beam. Also, the apparatus involves the second dichroic beam splitter to split the second circulated beam into the second optical beam and the reference optical telescope beam.

Additionally, the apparatus involves an interferometer to receive the first optical beam and the second optical beam, and to output an in-phase signal and a quadrature signal, which together form a sinusoidal signal. Also, the apparatus involves at least one processor to filter the sinusoidal signal to form a high frequency signal and a low frequency signal. In addition, the apparatus involves a stage controller to control the translation stage by using the low frequency signal. Further, the apparatus involves a fiber stretcher controller to control the fiber stretcher by using the high frequency signal.

In at least one embodiment, the apparatus further involves a telescope light receiving interferometer to receive the adjustable optical telescope beam and the reference optical telescope beam, and to produce a binocular image. In one or more embodiments, the apparatus further involves a first amplifier to amplify the in-phase signal, and a second amplifier to amplify the quadrature signal. In some embodiments, the apparatus further involves a filter buffer card to prefilter the in-phase signal and the quadrature signal to be within at least one predetermined frequency band.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

Figure 1:
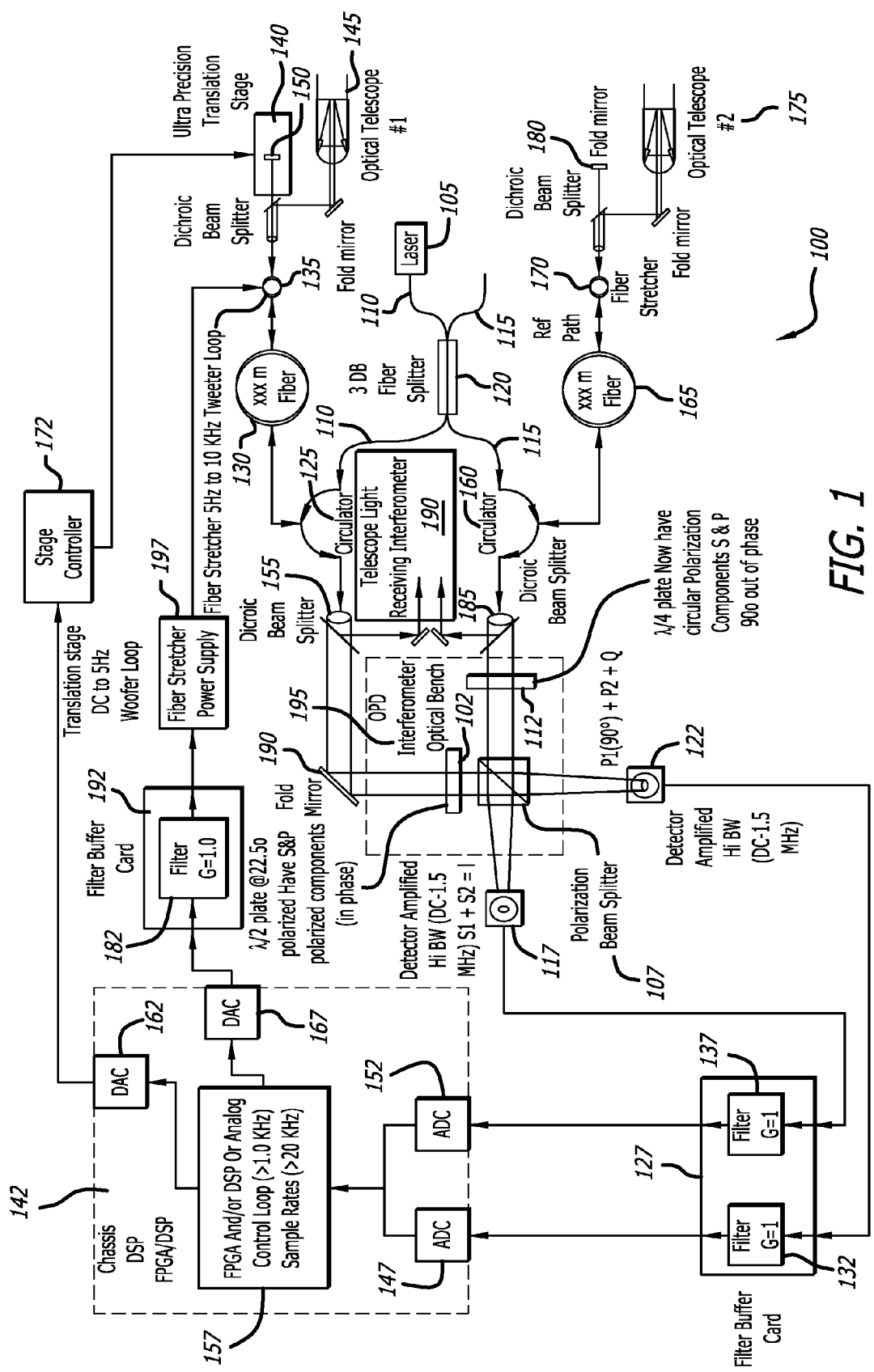
FIG. 1 is a schematic diagram illustrating the disclosed system for fiber stabilization of optical path differences (OPD) over a wide bandwidth frequency range for extended periods of time, in accordance with at least one embodiment of the present disclosure.

The methods and apparatus disclosed herein provide an operative system for fiber stabilization of optical path differences (OPD) over a wide bandwidth frequency range for extended periods of time. The objective of the present disclosure is to collect light from two telescopes through optical fibers, with minimal optical path differences (OPD) and optical dispersion, while using a reference laser, which is coupled to the two optical fibers. The reference laser beam is radiated up each optical fiber and retro-reflected, and then it is sent to a metrology interferometer. The interferometer output is collected and processed by a central processor, where the collected phase error signal is separated into two separate frequency bands. The control architecture divides the frequency bands, such that a wideband (e.g., direct current (DC) to 5 kilohertz (kHz)) OPD control loop maintains the optical fiber path lengths to be matched to several orders of wavelengths, and locked to less than $\frac{1}{25}$ of a wave.

In order to increase imaging sensitivity, interferometric techniques have been developed in the astronomy community that utilize several telescopes spaced meters from each other. To collect the light with minimal optical path differences (OPD), a set of moveable mirrors had to be designed in a vacuum tunnel (to reduce air turbulence) to adjust for variations of OPD between the two telescopes. The collected light is sent to an interferometer. The interferometer output is then used to adjust the OPD variations via a control process. This standard method can be quite expensive in placing equipment in vacuum tunnels. In addition, the use of vacuum tunnels results in a system that is not portable or moveable.

The present disclosure employs this conventionally used key technology, which is needed for passive synthetic/interferometric imaging. As an example, two one-meter diameter telescopes are employed that are spaced 100 meters apart. These two telescopes are able to provide 100 times the spatial resolution of a single one-meter diameter telescope. It should be noted that for other implementations, the telescopes may be of a different diameter than one-meter and may be spaced apart at a different distance than 100 meters. The present disclosure utilizes this conventional technology, but employs optical fibers for the legs (i.e. the paths that route the light from the telescope to the detector), instead of using vacuum tunnels for the legs, which is traditionally done. The use of optical fibers for the legs allows for a significant reduction in infrastructure costs, and enables the telescopes to be moved, or a portable imaging system to be constructed. The present disclosure, when employing optical fibers for the legs, creates a compact imaging system, which can be integrated onto military platforms (e.g., aircraft, satellites, ships, and ground vehicles). In order to utilize the benefits of employing optical fiber legs with this imaging technique, a reliable, robust method for locking the OPD of the two fiber optical legs is needed. Unfortunately, optical fibers present more difficulties and sensitivity to environmental conditions when it comes to OPD control than do traditional vacuum tunnels.

The present disclosure teaches a system and method for controlling and locking the OPD of the optical fiber legs, thereby enabling the significant benefits of utilizing optical fibers. In particular, the present disclosure employs a reference laser, which is coupled to the two optical fibers. An optical beam produced by the laser is radiated up each fiber and retro-reflected, and then the beam is sent to a metrology interferometer. The interferometer output is collected and processed by a central processor, where the collected phase error signal is separated into two separate frequency bands. This control design utilizes the separate frequency bands for controlling the OPD. One frequency band is used to control the low frequency component (direct current (DC) to 1-5 Hertz (Hz)). The other frequency band is used to control the high frequency component (1-5 Hz to 10 kHz). The OPD of the optical fibers can be very sensitive to external disturbances. The specific disturbances addressed by the disclosed system design are thermal (DC to 1-5 Hz), mechanical vibrations (1-5 Hz up to 1 kHz), and acoustic vibrations (2 Hz to 20 kHz). By carefully selecting the type of optical fiber to be used, some of these disturbances can be minimized, but not completely. The present disclosure teaches a scheme that is able to minimize the effects of these disturbances by providing a system that removes the effects in the listed frequency bands. This is done by carefully controlling OPD actuators, which are intended to remove the effects specific to each frequency band. The actuators are individually servo-controlled by using the interferometer output as a feedback signal. The individual control loops can then stabilize the OPD variations to fractions of a wavelength over very long periods of time with minimal dispersion effects.

Currently, OPD stabilization in optical fibers is traditionally accomplished by injecting a metrology laser beam into the fiber, and reflecting the beam from a vibrating retro-reflector, thereby producing a control signal that is temporally modulated. The modulation can put additional noise on the fiber, but it can be frequency-control limited by the modulation process. In addition, traditionally fiber stretchers (from DC-5 kHz) are employed to control the OPD. When a fiber is stretched greater than 50 micrometers, dispersion effects start to affect the quality of the light passing through the fiber. A fiber stretcher controller is used to compensate for the effects of the fiber stretching.

It should be noted that the present disclosure eliminates the need to modulate and demodulate the light source or the retro-reflector, thereby adding no noise to the existing signal. This scheme also minimizes the dispersion effects by limiting the stretching of a fiber to less than one wave of the reference laser. The long term drift is controlled by the low frequency stage.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 is a schematic diagram illustrating the disclosed system 100 for fiber stabilization of optical path differences (OPD) over a wide bandwidth frequency range for extended periods of time, in accordance with at least one embodiment of the present disclosure. In this figure, a laser 105 radiates an optical beam in a first optical fiber 110. The first optical fiber 110 along with a second optical fiber 115 are connected to a three decibel (3 dB) beam splitter 120. The 3 dB beam splitter 120 splits the radiated optical beam in half, and outputs half of the optical beam (referred to as the first optical beam) on the first optical fiber 110 and the other half of the optical beam (referred to as the second optical beam) on the second optical fiber 115.

A first circulator 125 circulates the first optical beam optionally through a bundle of fiber 130 (e.g., xxx meters of fiber) and through a fiber stretcher 135 to a translation stage 140 of an adjustable optical telescope 145. The first optical beam is reflected back from a first mirror 150 on the translation stage 140. The first circulator 125 circulates a first circulated beam, which comprises the reflected first optical beam and the adjustable optical telescope beam, to a first dichroic beam splitter 155. The first dichroic beam splitter 155 spits the first circulated beam into the first optical beam and the adjustable telescope beam.

A second circulator 160 circulates the second optical beam optionally through a bundle of fiber 165 (e.g., xxx meters of fiber) and optionally through a fiber stretcher 170 to a reference optical telescope 175. The second optical beam is reflected back from a second mirror 180 of the reference optical telescope 175. The second circulator 160 circulates a second circulated beam, which comprises the reflected second optical beam and the reference optical telescope beam, to a second dichroic beam splitter 185. The second dichroic beam splitter 185 spits the second circulated beam into the second optical beam and the reference telescope beam.

The adjustable telescope beam and the reference telescope beam are input into a telescope light receiving interferometer 190, which is used to produce a binocular image. The first optical beam is reflected off a mirror 190 and input into an OPD interferometer optical bench (e.g., a Michelson interferometer) 195. Inside of the interferometer 195, the first optical beam passes through a half wavelength ($\lambda/2$) plate with 22.5 degrees of polarization, which causes the first optical beam to have its circular polarization components (S1 and P1) in phase with each other. The second optical beam is input into the interferometer 195. Inside of the interferometer 195, the second optical beam passes through a quarter wavelength ($\lambda/4$) plate, which causes the second optical beam to have its circular polarization components (S2 and P2) 90 degrees out of phase with each other.

The first optical beam and second optical beam then pass through a polarization beam splitter 107. A beam with the S1 and S2 components, where the components are in-phase (i.e. S1+S1=I (in-phase)), are output from the interferometer 195. A beam with the P1 and P2 components, where the components are quadrature (i.e. P1(90 degrees)+P2=Q (quadrature)) are output from the interferometer 195.

A high bandwidth (DC to 1.5 megahertz (MHz)) detector 117 detects the in-phase beam (i.e. the beam with the S1 and S2 components), and produces an amplified in-phase signal. Another high bandwidth (DC to 1.5 MHz) detector 122 detects the quadrature beam (i.e. the beam with the P1 and P2 components), and produces an amplified quadrature signal. It should be noted that the in-phase signal and the quadrature signal together form a sinusoidal signal. The amplified in-phase signal is filtered with a filter 132 (with a gain of one (G=1)) on a filter buffer card 127, and the amplified quadrature signal is filtered with a filter 137 (with a gain of one (G=1)) on the filter buffer card 127. The filtered in-phase signal and the filtered quadrature signal are input into a field programmable gate array (FPGA) digital signal processor (DSP) chassis 142 for processing.

Inside of the FPGA DSP chassis 142, the analog filtered in-phase signal is input into an analog-to-digital converter (ADC) 152 to produce a digital in-phase signal. And, the analog filtered quadrature signal is input into an ADC 147 to produce a digital quadrature signal. The digital in-phase signal and the digital quadrature signal are input into a DSP 157 (or alternatively into an analog control loop of greater than 1.0 kHz with a sampling rate of greater than 20 kHz) for processing. After the processing, the DSP 157 outputs a digital woofer command signal and a digital tweeter command signal. The digital woofer command signal is input into a digital-to-analog converter (DAC) 162 to produce an analog woofer command signal (DC to 5 Hz). And, the tweeter command signal is input into a DAC 167 to produce an analog tweeter command signal (5 Hz to 10 kHz).

The analog woofer command signal is input into a stage controller 172. The stage controller 172 sends a signal (e.g., a voltage) to control (i.e. to slide back and/or forth) the translation stage 140 according to the analog woofer signal in order to correct for OPD. The analog tweeter signal is input into a filter 182 (with a gain of one (G=1)) on a filter buffer card 192. The filtered analog tweeter signal is input into a fiber stretcher power supply 197. The fiber stretcher power supply 197 sends a signal (e.g., a voltage) to control the fiber stretcher 135 in order to correct for OPD.

Figure 2:
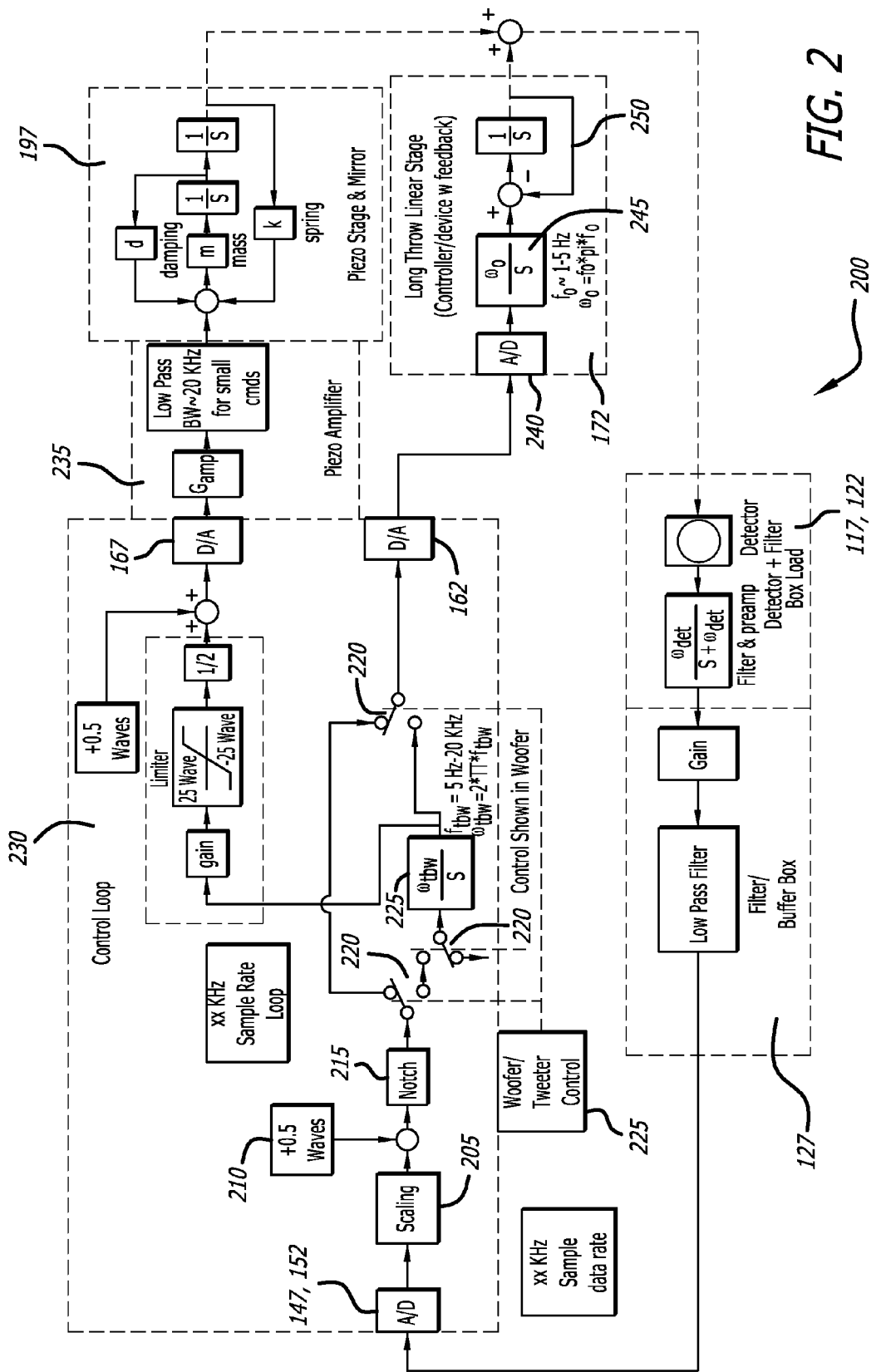
FIG. 2 is a schematic diagram depicting further details of the disclosed system of FIG. 1, in accordance with at least one embodiment of the present disclosure.

FIG. 2 is a schematic diagram 200 depicting further details of the disclosed system 100 of FIG. 1, in accordance with at least one embodiment of the present disclosure. It should be noted that, in order to provide a more simplified view of the details of the system 100, this figure only shows one of the beams/signals (i.e. the in-phase beam/signal or the quadrature beam/signal) being passed through the detector 117, 122 and the filter 137, 132. As such, in this figure, a beam (i.e. either the in-phase beam or the quadrature beam) is input into the detector 117, 122. The detector 117, 122 detects the beam, and produces an amplified signal. The amplified signal is input into a filter buffer card 127. The filter buffer card 127 filters the amplified signal to produce a filtered amplified signal. The analog filtered amplified signal is then input into an ADC 147, 152 to produce a digital signal.

A digital sinusoidal signal is scaled by a scaler 205, shifted by half a wave 210, and sent through a notch filter 215. The resultant signal, depending upon the position of a number of switches 220, is either sent through a woofer path or a tweeter path. A woofer/tweeter controller 225 controls the position of the switches 220. It should be noted that in FIG. 2, the switches 220 are depicted in positions that would cause the signal to proceed to the woofer path. For the signal to proceed to both the tweeter path and the woofer path, the switches 220 will be positioned in the opposite positions than is shown in FIG. 2. At the output of the notch filter 215 and the input to the switches 220 is a wideband error signal that is sent to both the woofer and tweeter controllers. The woofer controller is closed first and allowed to settle down, as currently depicted by the switches 220. The design of the woofer loop will respond from DC to 5 Hz. Once the woofer error is approximately zero, the switches are reversed so that both the woofer and tweeter are now engaged.

When the signal proceeds through the tweeter path, the high bandwidth error signal is integrated by an integrator ($_{wtbw}$/s, where $_{wtbw}$=2*π*$_{ftbw}$ and $_{ftbw}$=5 Hz to 20 kHz) 225. The integrated signal is then fed through a control loop 230. The control loop 230 produces a digital tweeter command signal. The digital tweeter command signal is input into a DAC 167 to produce an analog tweeter command signal. The analog tweeter command signal is input into a piezo amplifier, where it is amplified and filtered. The amplified analog tweeter command signal is then input into a fiber stretcher power supply 197, which includes a control feedback loop. The fiber stretcher power supply 197 sends a signal (e.g., a voltage) to control the fiber stretcher 135 in order to correct for OPD.

When the signal proceeds through the woofer path, the digital signal is input into a DAC 162 to produce an analog signal. The analog signal is then input into a stage controller 172. Inside the stage controller 172, the analog signal is input into an ADC 240 to produce a digital signal. The digital signal is then integrated by an integrator ($w_o$/s, were $w_o$=2*π*$f_o$ and $f_o$ ~1 to 5 Hz) 245. The resultant signal is sent through a control feedback loop 250 to produce a control signal. The stage controller 172 sends the control signal (e.g., a voltage) to control (i.e. to slide back and/or forth) the translation stage 140 according to the analog woofer signal in order to correct for OPD.

Figure 3:
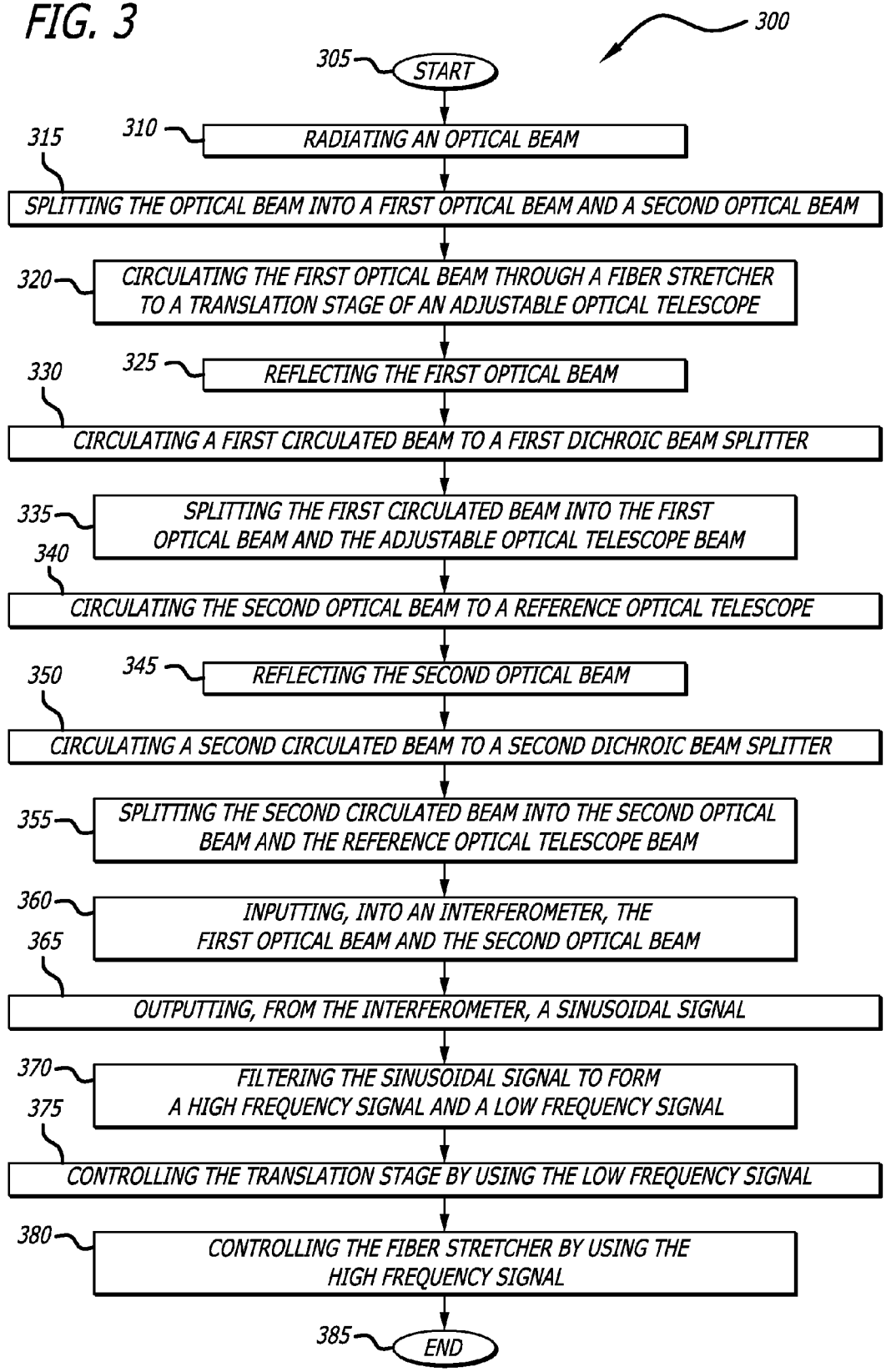
FIG. 3 is a flow chart showing the disclosed method for fiber stabilization of OPD over a wide bandwidth frequency range for extended periods of time, in accordance with at least one embodiment of the present disclosure.

FIG. 3 is a flow chart showing the disclosed method 300 for fiber stabilization of OPD over a wide bandwidth frequency range for extended periods of time, in accordance with at least one embodiment of the present disclosure. At the start 305 of the method 100, a laser radiates an optical beam 310. Then, a beam splitter splits the optical beam into a first optical beam and a second optical beam 315.

A first circulator circulates the first optical beam through a fiber stretcher to a translation stage of an adjustable optical telescope 320. Then, a first mirror on the translation stage reflects the first optical beam 325. The first circulator then circulates a first circulated beam, which comprises the first optical beam and an adjustable optical telescope beam, to a first dichroic beam splitter 330. The first dichroic beam splitter splits the first circulated beam into the first optical beam and the adjustable optical telescope beam 335.

A second circulator circulates the second optical beam to a reference optical telescope 340. Then, a second mirror reflects the second optical beam 345. The second circulator then circulates a second circulated beam, which comprises the second optical beam and a reference optical telescope beam, to a second dichroic beam splitter 350. The second dichroic beam splitter splits the second circulated beam into the second optical beam and the reference optical telescope beam 355.

The first optical beam and the second optical beam are input into an interferometer 360. The interferometer outputs an in-phase signal and a quadrature signal, which together form a sinusoidal signal 365. Then at least one processor filters the sinusoidal signal to form a high frequency signal and a low frequency signal 370. A stage controller controls the translation stage by using the low frequency signal 375. A fiber stretcher controller controls the fiber stretcher by using the high frequency signal 380. Then, the method 300 ends 385.

Figure 4:
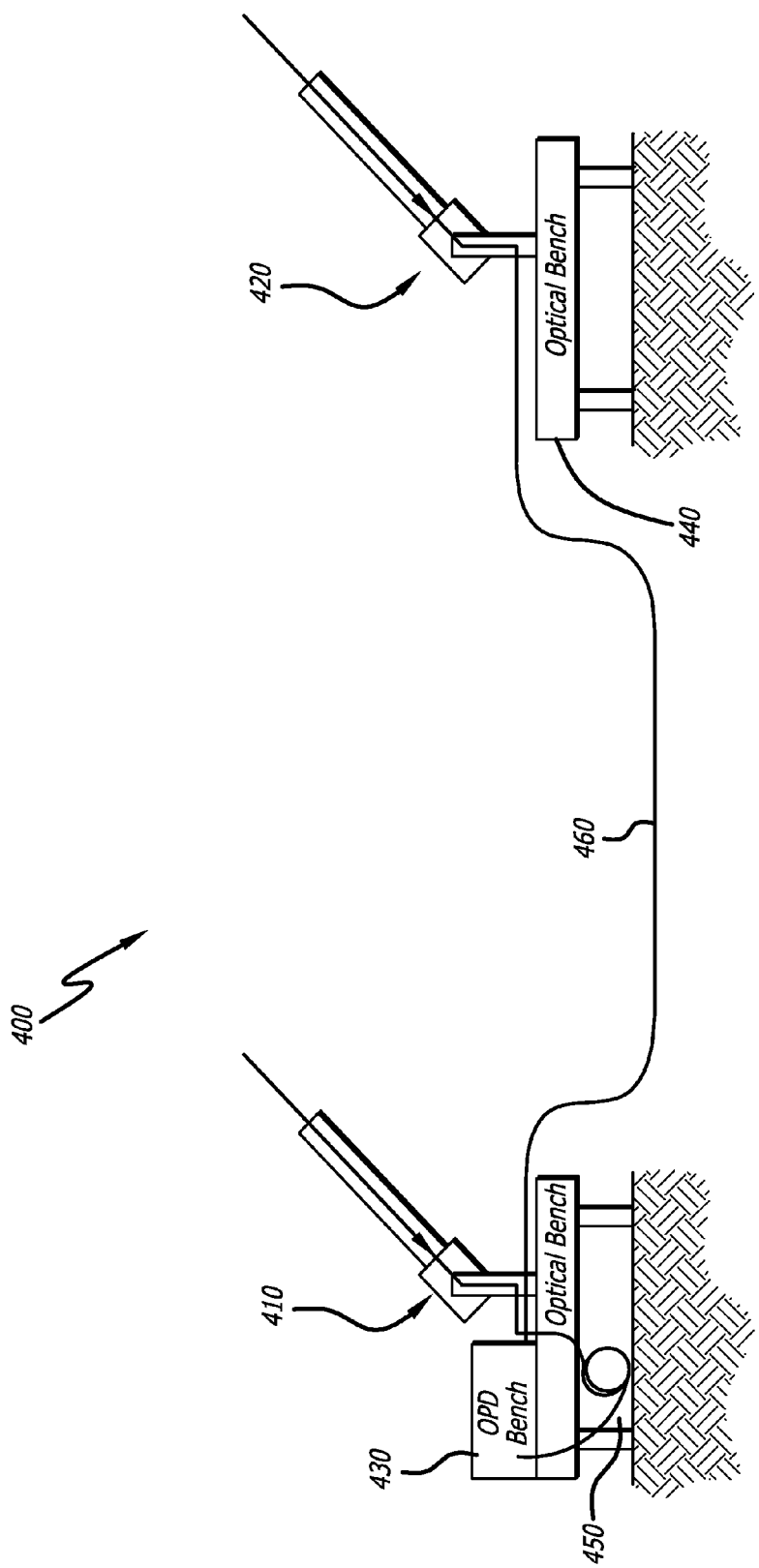
FIG. 4 is a schematic diagram illustrating the telescope configuration for the disclosed system of FIG. 1, in accordance with at least one embodiment of the present disclosure.

FIG. 4 is a schematic diagram illustrating the telescope configuration 400 for the disclosed system 100 of FIG. 1, in accordance with at least one embodiment of the present disclosure. Specifically, this figure shows the basic telescope geometry, where the OPD between the separated telescopes 410, 420 are controlled to maintain optical phase coherence between the two telescopes 410, 420. Telescope 410 is a reference optical telescope and telescope 420 is an adjustable optical telescope. During operation, the OPD are detected with an interferometer on the OPD bench 430, and a controller determines that needed corrections. The lower frequency OPD are corrected with a moveable optical bench 440. The higher frequency OPD are corrected by using a fiber stretcher 450 that stretches the optical fiber cable 460.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for fiber stabilization of optical path differences, the method comprising:
   radiating, by a laser, an optical beam;
   splitting, by a beam splitter, the optical beam into a first optical beam and a second optical beam;
   reflecting, by a first mirror on a translation stage of an adjustable optical telescope, the first optical beam;
   splitting, by a first dichroic beam splitter, a first circulated beam into the first optical beam and an adjustable optical telescope beam;
   reflecting, by a second mirror associated with a reference optical telescope, the second optical beam;
   splitting, by a second dichroic beam splitter, a second circulated beam into the second optical beam and a reference optical telescope beam;
   inputting, into an interferometer, the first optical beam and the second optical beam;
   outputting, from the interferometer, an in-phase signal and a quadrature signal, which together form a sinusoidal signal;

filtering, by at least one processor, the sinusoidal signal to form a high frequency signal and a low frequency signal;
controlling, with a stage controller, the translation stage by using the low frequency signal; and
controlling, with a fiber stretcher controller, a fiber stretcher by using the high frequency signal.

2. The method of claim 1, wherein the method further comprises inputting, into a telescope light receiving interferometer, the adjustable optical telescope beam and the reference optical telescope beam, to produce a binocular image.

3. The method of claim 1, wherein the interferometer is a Michelson interferometer.

4. The method of claim 1, wherein the method further comprises amplifying with a first amplifier the in-phase signal, and amplifying with a second amplifier the quadrature signal.

5. The method of claim 1, wherein the method further comprises prefiltering, with a filter buffer card, the in-phase signal and the quadrature signal to be within at least one predetermined frequency band.

6. The method of claim 1, wherein the fiber stretcher controller is a fiber stretcher power supply.

7. The method of claim 1, wherein the filtering of the sinusoidal signal to form a high frequency signal and a low frequency signal, is performed by integrating the sinusoidal signal.

8. The method of claim 1, wherein the stage controller is a piezo electric controller.

9. A system for fiber stabilization of optical path differences, the system comprising:
a laser to radiate an optical beam;
a beam splitter to split the optical beam into a first optical beam and a second optical beam;
a first mirror, on a translation stage of an adjustable optical telescope, to reflect the first optical beam;
a first dichroic beam splitter to split a first circulated beam into the first optical beam and an adjustable optical telescope beam;
a second mirror associated with a reference optical telescope to reflect the second optical beam;
a second dichroic beam splitter to split a second circulated beam into the second optical beam and a reference optical telescope beam;
an interferometer to receive the first optical beam and the second optical beam, and to output an in-phase signal and a quadrature signal, which together form a sinusoidal signal;
at least one processor to filter the sinusoidal signal to form a high frequency signal and a low frequency signal;
a stage controller to control the translation stage by using the low frequency signal; and
a fiber stretcher controller to control a fiber stretcher by using the high frequency signal.

10. The system of claim 9, wherein the system further comprises a telescope light receiving interferometer to receive the adjustable optical telescope beam and the reference optical telescope beam, and to produce a binocular image.

11. The system of claim 9, wherein the interferometer is a Michelson interferometer.

12. The system of claim 9, wherein the system further comprises:
a first amplifier to amplify the in-phase signal; and
a second amplifier to amplify the quadrature signal.

13. The system of claim 9, wherein the system further comprises a filter buffer card to prefilter the in-phase signal and the quadrature signal to be within at least one predetermined frequency band.

14. The system of claim 9, wherein the fiber stretcher controller is a fiber stretcher power supply.

15. The system of claim 9, wherein the at least one processor, to filter the sinusoidal signal to form a high frequency signal and a low frequency signal, integrates the sinusoidal signal.

16. The system of claim 9, wherein the stage controller is a piezo electric controller.

17. An apparatus for fiber stabilization of optical path differences, the apparatus comprising:
a laser to radiate an optical beam;
a beam splitter to split the optical beam into a first optical beam and a second optical beam;
a first mirror, on a translation stage of an adjustable optical telescope, to reflect the first optical beam;
the first dichroic beam splitter to split a first circulated beam into the first optical beam and an adjustable optical telescope beam;
a second mirror associated with a reference optical telescope to reflect the second optical beam;
the second dichroic beam splitter to split a second circulated beam into the second optical beam and a reference optical telescope beam;
an interferometer to receive the first optical beam and the second optical beam, and to output an in-phase signal and a quadrature signal, which together form a sinusoidal signal;
at least one processor to filter the sinusoidal signal to form a high frequency signal and a low frequency signal;
a stage controller to control the translation stage by using the low frequency signal; and
a fiber stretcher controller to control a fiber stretcher by using the high frequency signal.

18. The apparatus of claim 17, wherein the apparatus further comprises a telescope light receiving interferometer to receive the adjustable optical telescope beam and the reference optical telescope beam, and to produce a binocular image.

19. The apparatus of claim 17, wherein the interferometer is a Michelson interferometer.

20. The apparatus of claim 17, wherein the apparatus further comprises:
a first amplifier to amplify the in-phase signal; and
a second amplifier to amplify the quadrature signal.

* * * * *